(No Model.)

H. S. MAXIM.
Electric Lamp.

No. 230,310.  Patented July 20, 1880.

Witnesses
Henry M. Hine
Henry Hine

Inventor
Hiram S. Maxim
by Leonard E. Curtis
atty.

UNITED STATES PATENT OFFICE.

HIRAM S. MAXIM, OF BROOKLYN, ASSIGNOR TO SPENCER D. SCHUYLER, OF NEW YORK, N. Y.

ELECTRIC LAMP.

SPECIFICATION forming part of Letters Patent No. 230,310, dated July 20, 1880.

Application filed April 20, 1880. (No model.)

*To all whom it may concern:*

Be it known that I, HIRAM S. MAXIM, of the city of Brooklyn, county of Kings, and State of New York, have invented certain new and useful Improvements in Electric Lamps, of which the following is a specification, reference being had to the accompanying drawings, which form a part hereof.

My invention relates more particularly to electric lamps having a continuous incandescent conductor; and it consists of an improved method of attaching such conductor to its electrical connections. Such conductors are preferably made of carbon, and the supports, forming at the same time the electrical connections, are usually made of platinum or other refractory metal, secured by clamps or similar devices to the ends of the conductor. Carbon suitable for such conductors is quite hard, and, as is well known, the surface of such materials is not perfectly smooth. Where the carbon is prepared by carbonizing card-board or other fibrous material, the surface, when examined under a microscope, appears to be made up of a succession of points corresponding to the ends of the fibers of the material used. As the platinum or other metal of the support is also quite hard, the contact between the carbon and the platinum where they are clamped together is very imperfect, and consists of a greater or less number of carbon points bearing upon the surface of the metal.

It is not practicable to form a perfect contact by applying sufficient pressure to drive the points of carbon into the metal, as such pressure would crush the carbon. When a sufficiently strong current is passed through the lamp to heat the carbon conductor to incandescence, the increase of resistance arising from the imperfection of contact between the carbon and platinum is liable to heat some of the points of carbon so highly as to melt a small part of the platinum immediately adjacent to them, and in that case a small voltaic arc is established, which soon destroys the metal of the connection.

It is the object of my present invention to form a more perfect and durable connection between the supports and the carbon conductor.

Figure 1:
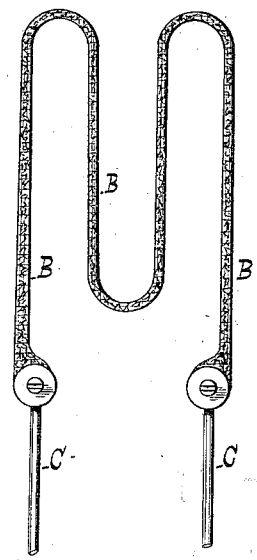
Figure 2:
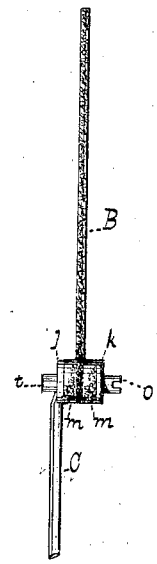
Figure 3:
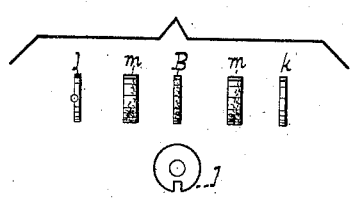

In the drawings, Figure 1 is a front view of the carbon and clamps. Fig. 2 is a side view of one of the clamps, and Fig. 3 is an end view of the several parts detached from each other.

B is a carbon conductor, forming the incandescent part of an electric lamp. Its lower ends are enlarged, as shown in Fig. 1, for the purpose of decreasing its resistance, and so preventing it from becoming as highly heated as the upper parts. These enlarged ends are flattened for convenience of attachment and for the purpose of providing a large surface of contact with the adjacent parts.

C C' are the supports, the upper ends of which are also enlarged and flattened. For convenience of construction I make the upper part of each support in a separate piece, shaped like a washer, with a hole or slot in its edge to receive the supporting rod or wire, which is secured in the hole by gold, solder, or in any other suitable way. This construction of the upper part of the support is best shown at $l$ in Fig. 3.

$k$ is a washer of platinum, and $m\ m$ are washers of soft carbon. The carbon washers I prefer to make of blotting-paper or other similar material carbonized by exposing it to a high heat in a suitable vessel; but such carbon may probably be prepared in other ways, and I do not wish to be limited to carbon prepared in any particular way. It is essential, however, that the carbon of which the washers $m\ m$ are made should be comparatively soft and yielding. The parts are put together in the order shown in Fig. 2, with one of the soft-carbon washers $m\ m$ upon each side of and in contact with the flattened end of the conductor, and outside of these the platinum washers $l$ and $k$. The whole is held in place by the platinum bolt or screw $o$, passing through all, and the nut $t$, which is screwed up as tightly as may conveniently be done without injury to the parts. The carbon washers, yielding to the pressure, fit into all the inequalities of the opposing surfaces and form a durable packing between the conductor and the platinum supports, thus insuring perfect electrical connection between the parts.

It is not necessary that the particular form of clamp described should be used, nor is it essential to use a carbon washer on each side of the conductor, although I find the form of clamp shown convenient and efficient.

The essential feature of my invention is the use of a washer or other form of soft carbon interposed between the carbon conductor and its electrical connection.

I am aware that such conductors have been secured to their supports by various forms of clamping devices, and I do not claim such connection of the parts independently of the use of a washer or washers of carbon, as set forth; but, Having described my invention, what I claim as new, and desire to secure by Letters Patent, is—

1. The combination, in an electric lamp, of a continuous carbon conductor, metallic electrical connections for the same, and one or more washers of soft carbon interposed between said conductor and each metallic connection, substantially as described.

2. The combination, in an electric lamp, of the carbon conductor B, the support C, having the flattened end $l$, the washers $m$ $m$ and $k$, and the pin $o$, and nut $t$, substantially as described.

HIRAM S. MAXIM.

Witnesses:
 J. C. CHAMBERLAIN,
 HENRY HINE.